United States Patent
Chae et al.

(10) Patent No.: US 11,272,467 B2
(45) Date of Patent: Mar. 8, 2022

(54) METHOD FOR TRANSMITTING AND RECEIVING SIDELINK SIGNAL OF UE USING GNSS TIMING IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/090,155

(22) PCT Filed: Mar. 30, 2017

(86) PCT No.: PCT/KR2017/003514
§ 371 (c)(1),
(2) Date: Sep. 28, 2018

(87) PCT Pub. No.: WO2017/171447
PCT Pub. Date: Oct. 5, 2017

(65) Prior Publication Data
US 2019/0116565 A1    Apr. 18, 2019

Related U.S. Application Data

(60) Provisional application No. 62/335,672, filed on May 12, 2016, provisional application No. 62/316,569, (Continued)

(51) Int. Cl.
*H04W 56/00* (2009.01)
*H04W 76/15* (2018.01)
(Continued)

(52) U.S. Cl.
CPC ......... *H04W 56/001* (2013.01); *G01S 19/256* (2013.01); *H04W 24/10* (2013.01); (Continued)

(58) Field of Classification Search
CPC ... H04W 56/001; H04W 76/15; H04W 76/14; H04W 24/10; H04W 56/002; (Continued)

(56) References Cited

U.S. PATENT DOCUMENTS

2015/0358847 A1* 12/2015 Takahashi ............. H04L 1/1854
370/252
2016/0142898 A1*  5/2016 Poitau ................... H04W 76/14
370/329
(Continued)

FOREIGN PATENT DOCUMENTS

KR    1020150110616    10/2015
KR    1020150128387    11/2015
(Continued)

OTHER PUBLICATIONS

PCT International Application No. PCT/KR2017/003514, Written Opinion of the International Searching Authority dated Jun. 23, 2017, 16 pages.

*Primary Examiner* — Kwang B Yao
*Assistant Examiner* — Xuan Lu
(74) *Attorney, Agent, or Firm* — Lee, Hong, Degerman, Kang & Waimey PC

(57) ABSTRACT

One embodiment of the present invention relates to a method of transmitting and receiving a sidelink signal of a UE, comprising the steps of: receiving, by the UE from one or more of a base station or a sidelink UE, information capable of distinguishing a mode 1/3 signal or a mode 2/4 signal or control information comprising a priority assigned to each of the mode 1/3 and the mode 2/4; determining
(Continued)

whether or not a mode 1/3 resource is used by a UE other than the UE, on the basis of the information capable of distinguishing the mode 1/3 signal or the mode 2/4 signal; and requesting, by the UE, a resource reselection to the base station, if the mode 1/3 resource is used by a UE other than the UE and the UE is a mode 1/3 UE.

2 Claims, 11 Drawing Sheets

Related U.S. Application Data filed on Apr. 1, 2016, provisional application No. 62/317,480, filed on Apr. 1, 2016, provisional application No. 62/315,637, filed on Mar. 30, 2016.

(51) Int. Cl.
| | | |
|---|---|---|
| *H04W 76/14* | (2018.01) | |
| *G01S 19/25* | (2010.01) | |
| *H04W 72/12* | (2009.01) | |
| *H04W 24/10* | (2009.01) | |
| *H04W 72/04* | (2009.01) | |
| *H04W 92/18* | (2009.01) | |

(52) U.S. Cl.
CPC ..... *H04W 56/002* (2013.01); *H04W 72/1242* (2013.01); *H04W 76/14* (2018.02); *H04W 76/15* (2018.02); *H04W 72/0446* (2013.01); *H04W 92/18* (2013.01)

(58) Field of Classification Search
CPC ......... H04W 72/1242; H04W 72/0446; H04W 92/18; G01S 19/256
USPC .......................................................... 370/350
See application file for complete search history.

(56) References Cited

U.S. PATENT DOCUMENTS

| | | | |
|---|---|---|---|
| 2016/0302250 A1* | 10/2016 | Sheng | H04W 4/70 |
| 2017/0215119 A1* | 7/2017 | Hong | H04W 36/0072 |
| 2017/0311319 A1* | 10/2017 | Lee | H04L 1/189 |
| 2017/0347270 A1* | 11/2017 | Iouchi | H04W 16/14 |
| 2018/0176806 A1* | 6/2018 | Suzuki | H04J 11/00 |
| 2018/0213500 A1* | 7/2018 | Li | H04J 3/0638 |
| 2018/0302768 A1* | 10/2018 | Uchiyama | H04W 4/44 |
| 2019/0045521 A1* | 2/2019 | Hong | H04W 56/001 |
| 2019/0261371 A1* | 8/2019 | Kim | H04W 8/24 |
| 2019/0261442 A1* | 8/2019 | Yoon | H04W 8/005 |

FOREIGN PATENT DOCUMENTS

| | | | |
|---|---|---|---|
| KR | 1020160018313 | 2/2016 | |
| WO | 2015021345 | 2/2015 | |
| WO | WO-2015137781 A1 * | 9/2015 | ........ H04W 56/0015 |
| WO | 2015152581 | 10/2015 | |

* cited by examiner

FIG. 5
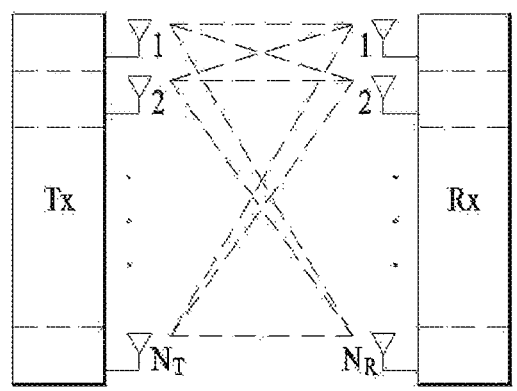
(a)
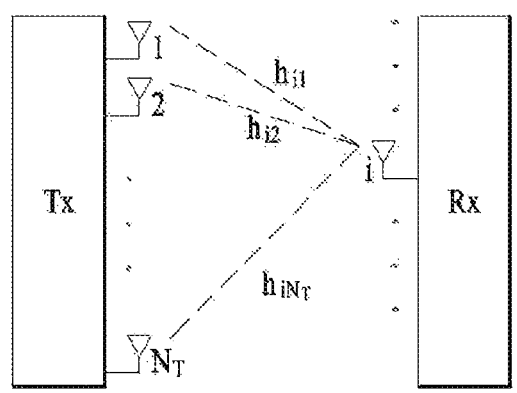
(b)

FIG. 8
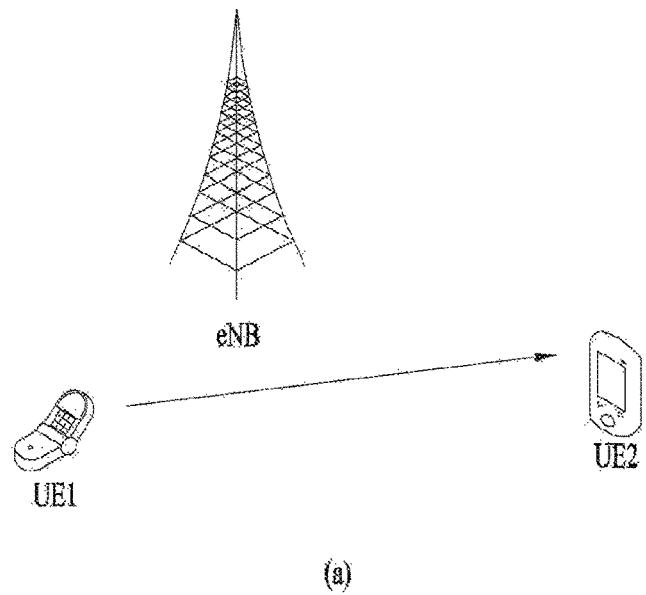
(a)
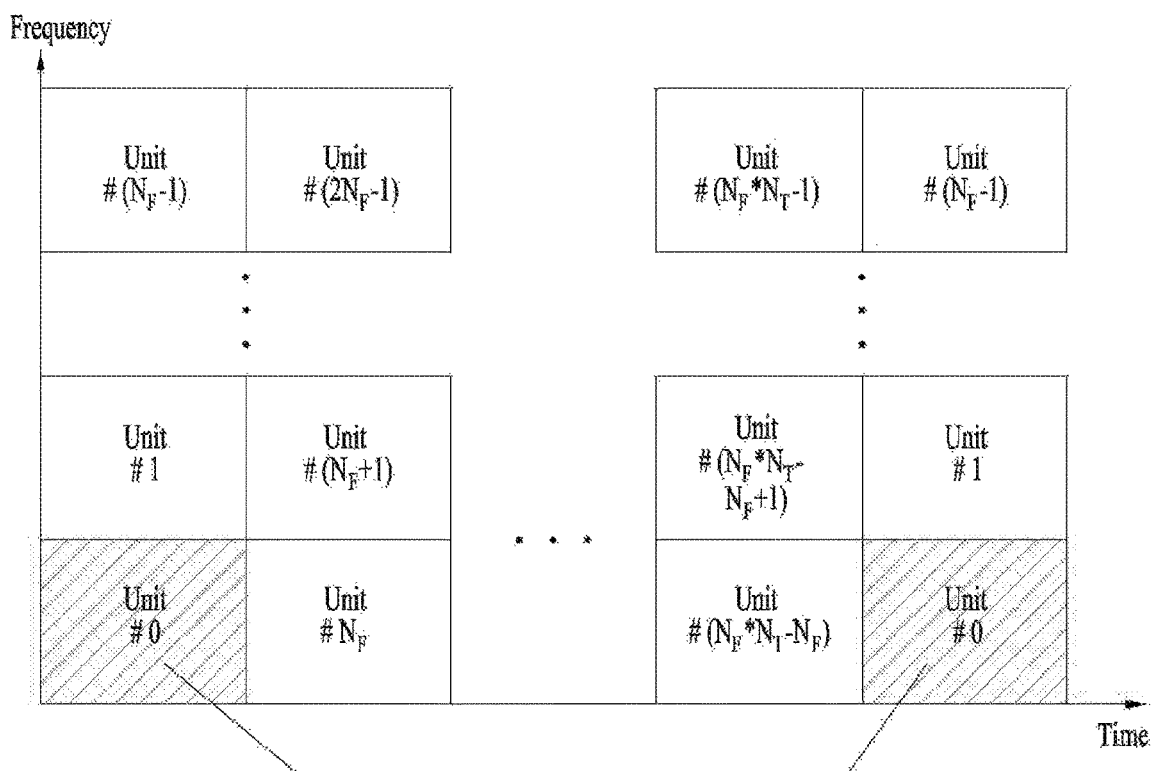
(b)

METHOD FOR TRANSMITTING AND RECEIVING SIDELINK SIGNAL OF UE USING GNSS TIMING IN WIRELESS COMMUNICATION SYSTEM

CROSS-REFERENCE TO RELATED APPLICATIONS

This application is the National Stage filing under 35 U.S.C. 371 of International Application No. PCT/KR2017/003514, filed on Mar. 30, 2017, which claims the benefit of U.S. Provisional Application No. 62/315,637, filed on Mar. 30, 2016, 62/316,569, filed on Apr. 1, 2016, 62/317,480, filed on Apr. 1, 2016, and 62/335,672, filed on May 12, 2016, the contents of which are all hereby incorporated by reference herein in their entirety.

TECHNICAL FIELD

The present disclosure relates to a wireless communication system, and more particularly, to a method and apparatus for transmitting and receiving a sidelink signal by a user equipment (UE) using a global navigation satellite system (GNSS) timing.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide operations of a transmitting entity and a receiving entity, when a user equipment (UE) operates on the basis of a global navigation satellite system (GNSS) timing, and a base station (BS) does not have knowledge of the GNSS timing.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting and receiving a sidelink signal by a user equipment (UE) in a wireless communication system includes receiving, from one or more of a base station (BS) or a sidelink UE, control information including information identifying a mode-1/3 signal or a mode-2/4 signal, or priority levels assigned to mode 1/3 and mode 1/4, respectively, determining whether any UE other than the UE is using mode-1/3 resources on the basis of the information identifying a mode-1/3 signal or a mode-2/4 signal, and if any UE other than the UE is using mode-1/3 resources, and the UE is a mode-1/3 UE, requesting resource reselection to the BS.

In another aspect of the present disclosure, a UE for transmitting and receiving a sidelink signal in a wireless communication system includes a transmitter and a receiver, and a processor. The processor is configured to receive, from one or more of a base station (BS) and a sidelink UE, control information including information identifying a mode-1/3 signal or a mode-2/4 signal, or priority levels assigned to mode 1/3 and mode 1/4, respectively, through the receiver, to determine whether any UE other than the UE is using mode 1/3 resources on the basis of the information identifying a mode-1/3 signal or a mode-2/4 signal, and if any UE other than the UE is using mode-1/3 resources, and the UE is a mode-1/3 UE, to request resource reselection to the BS.

The UE may transmit, to a sidelink UE, the control information including the information identifying a mode-1/3 signal or a mode-2/4 signal, or the priority levels assigned to mode 1/3 and mode 1/4, respectively.

If any UE other than the UE is using mode-1/3 resources, and the UE is a mode-2/4 UE, the UE may perform resource reselection.

The mode-1/3 resources may have a common area with mode-2/4 resources.

The UE may decode data corresponding to mode 1/3 with priority from among a plurality of received data, on the basis of the information identifying a mode-1/3 signal.

The method may further include receiving, from the BS, coordinated universal time (UTC) timing-related information for applying the control information, comparing the UTC timing-related information with a UTC timing of the UE, and if a timing difference is equal to or larger than a predetermined threshold as a result of the comparison, reporting the timing difference to the BS.

The UTC timing of the UE may be global navigation satellite system (GNSS)-based, and the UTC timing-related information of the BS is not GNSS-based.

The UTC timing-related information may be one of a UTC timing of the BS or radio frame/subframe boundary information based on the UTC timing of the BS.

If the timing difference is less than the threshold as a result of the comparison, the UE may apply the control information according to the UTC timing-related information.

The UE may apply the control information according to the UTC timing-related information, irrespective of the report.

The UE may transmit the timing difference to a sidelink signal receiving UE, and the timing difference may be transmitted to the sidelink signal receiving UE in at least one of a sidelink synchronization signal (SLSS), a physical sidelink broadcast channel (PSBCH), a physical sidelink shared channel (PSSCH), or a physical sidelink control channel (PSCCH).

If the control information corresponds to semi-persistent scheduling (SPS), the UTC timing-related information may be included only in an SPS activation, not in an SPS release.

If an uplink transmission based on the SPS overlaps with a sidelink transmission, the UE may drop one of the transmissions according to predetermined priority levels.

A safety message may have priority over an uplink transmission according to the predetermined priority levels.

If the UE is set in mode 1 or mode 3, the UE may always use only the UTC timing-related information, irrespective of the report.

Advantageous Effects

According to the present disclosure, the ambiguity of a UE operation, which may arise from GNSS timing-based sidelink transmission and reception of a UE, can be reduced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE FOR CARRYING OUT THE INVENTION

Figure 1:
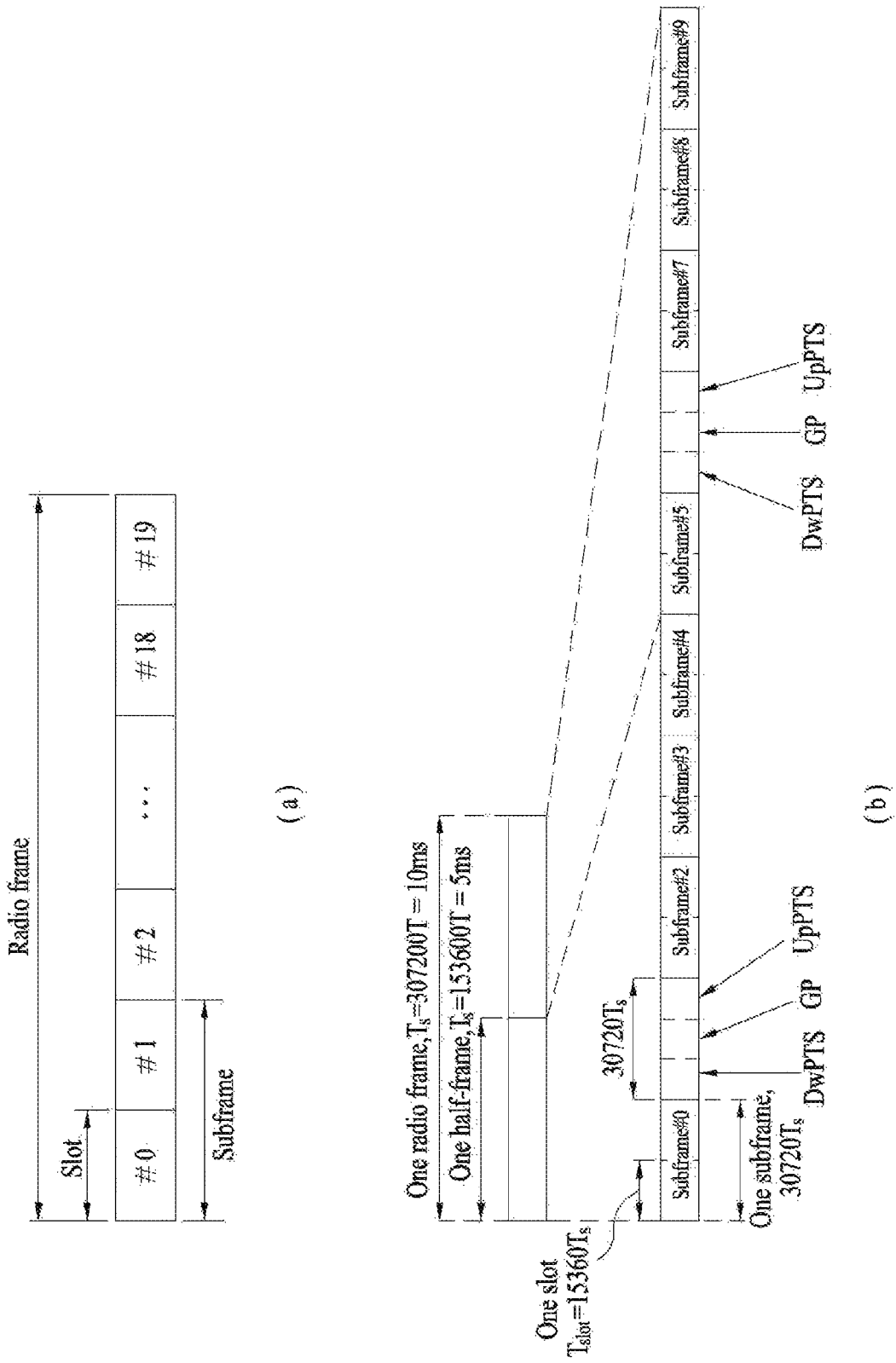
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
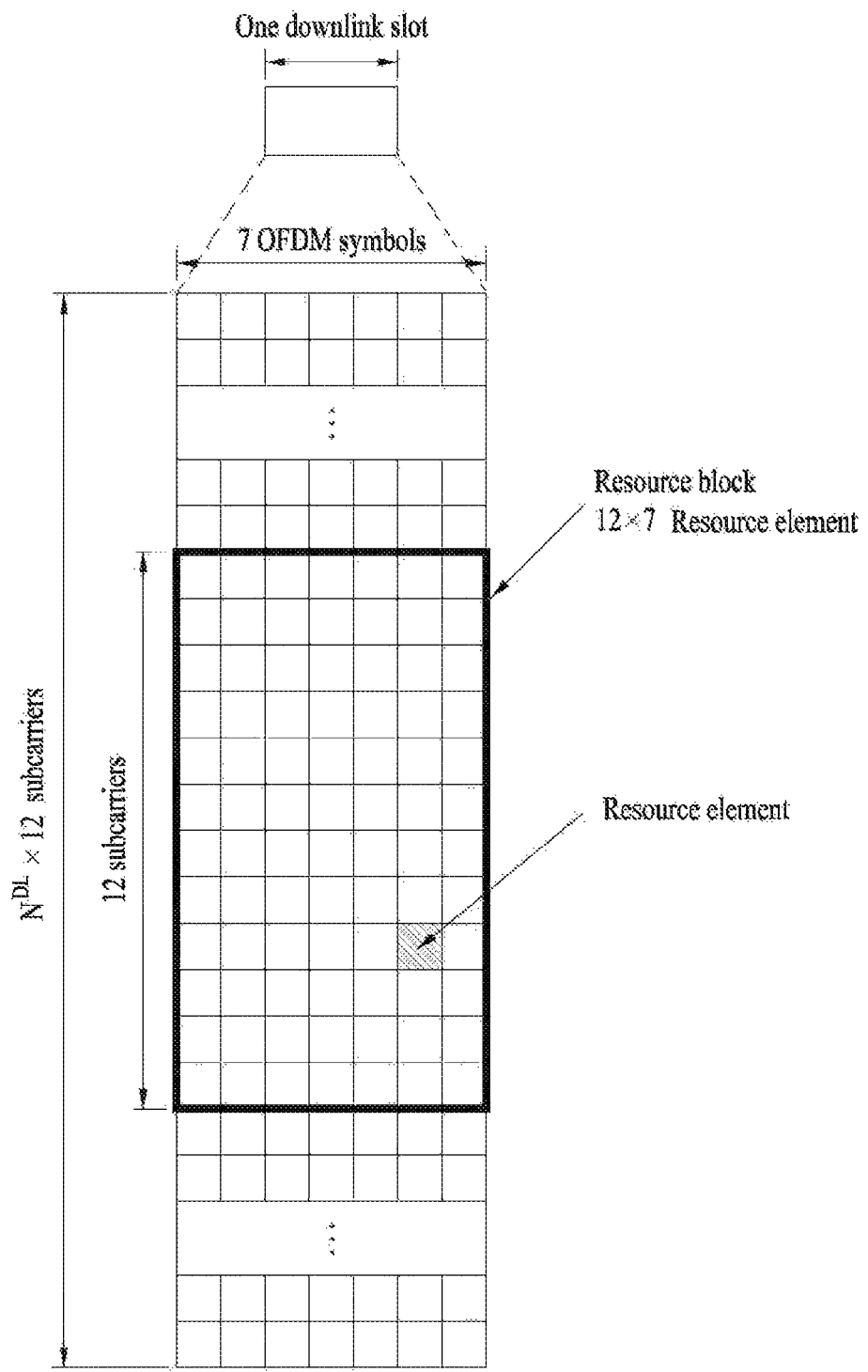
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
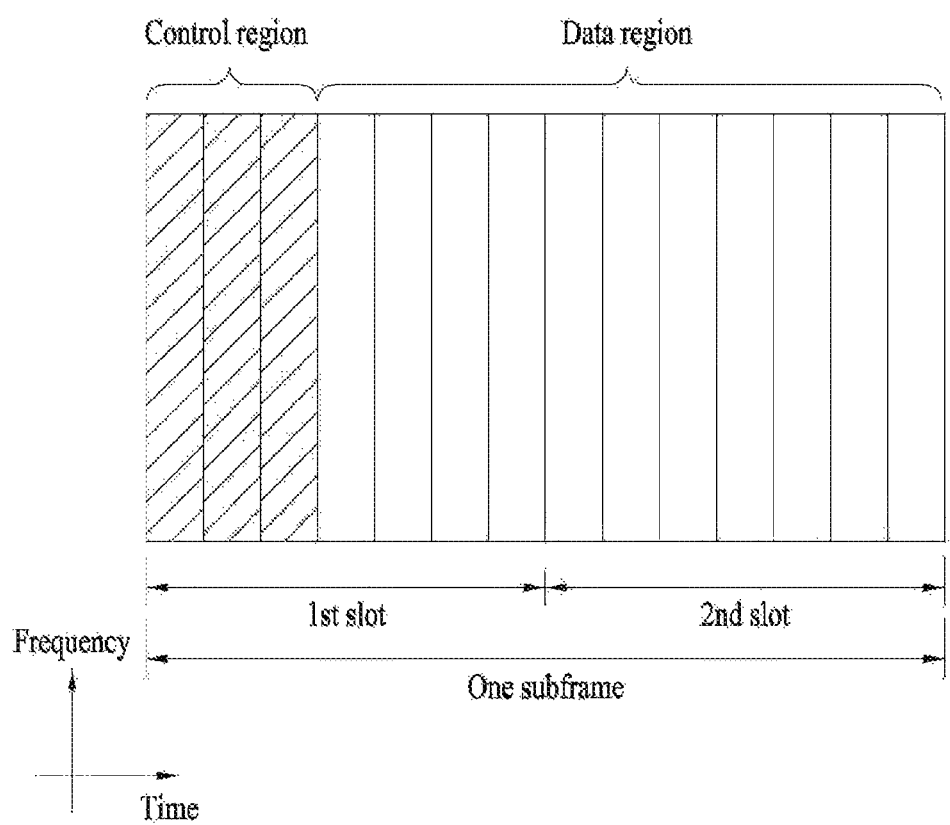
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
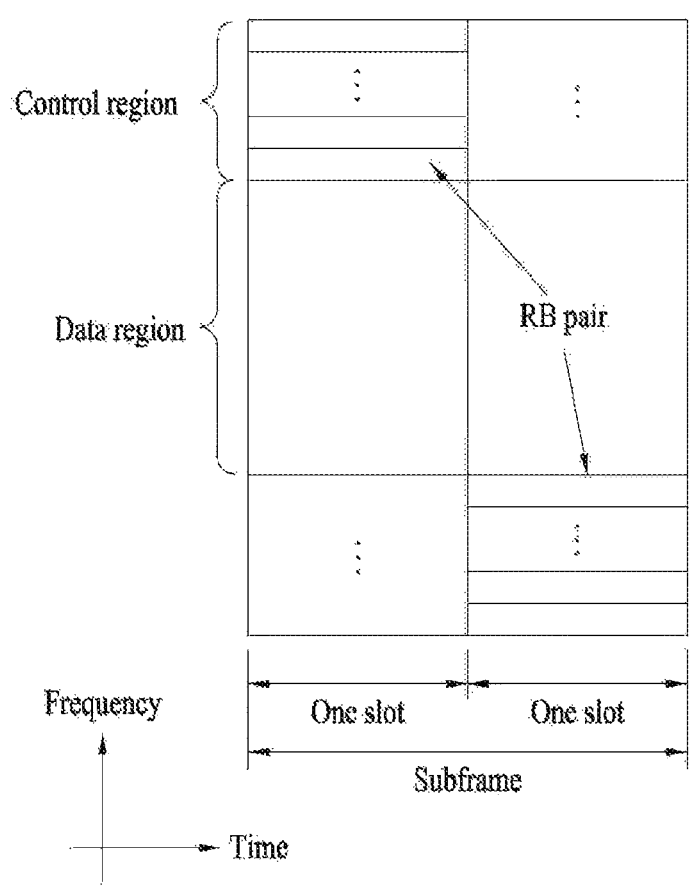
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots \hat{s}_{N_T}]^T=[P_1s_1,P_2s_2,\ldots P_{N_T}s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots n_{N_R}$ respectively added to the $N_R$ Rx antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T,N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
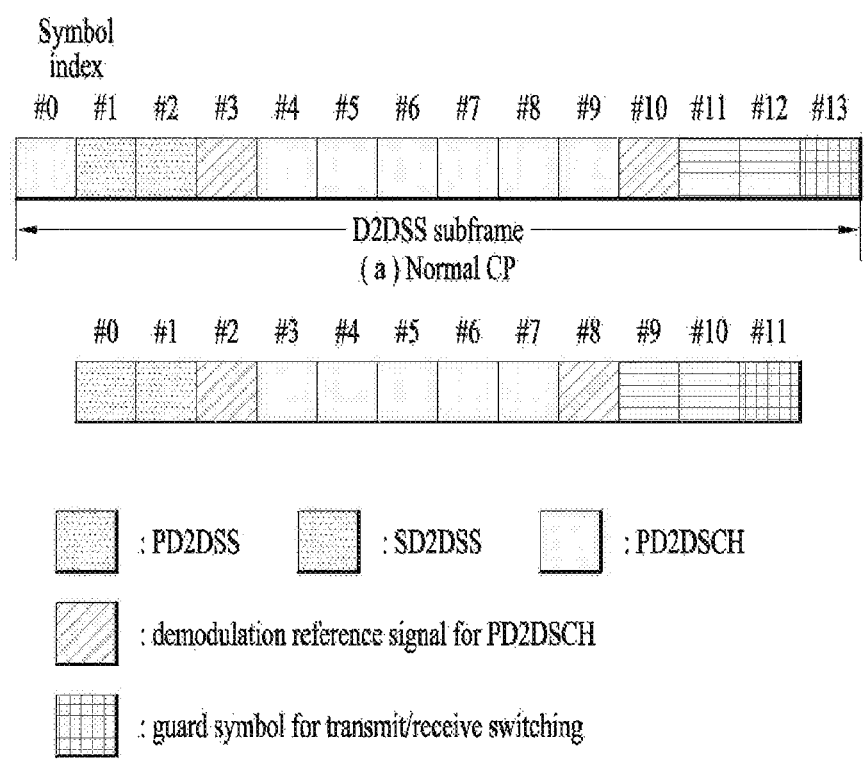
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
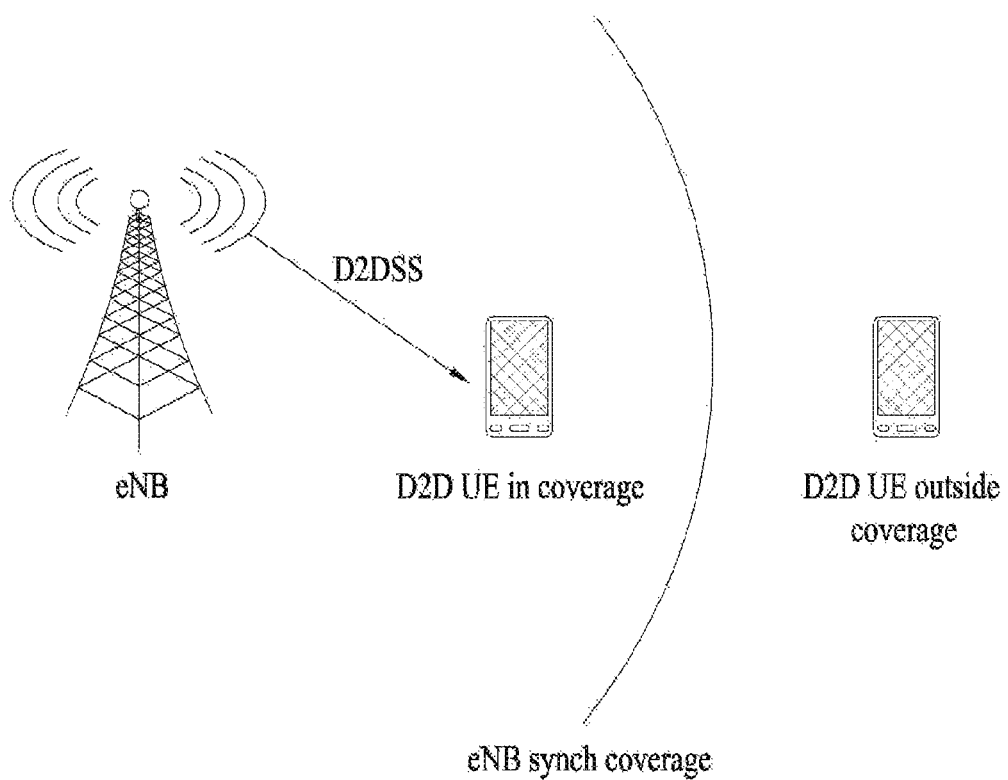
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
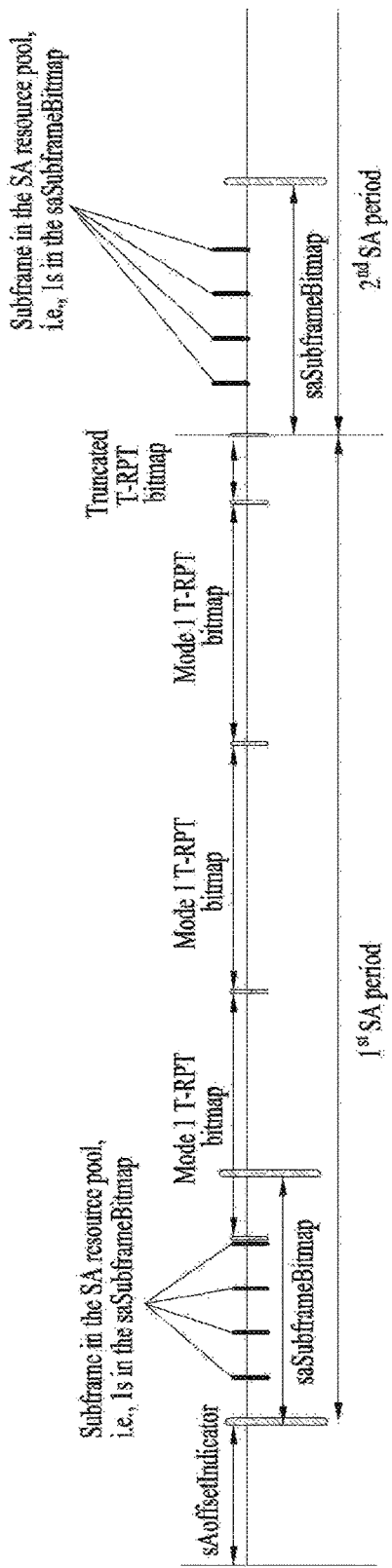
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V communication, a cooperative awareness message (CAM) of a periodic message type, a decentralized environmental notification message (DENM) of an event triggered message type, or the like may be transmitted. The CAM may include dynamic state information about a vehicle, such as the direction and speed of the vehicle, vehicle static data such as the dimensions of the vehicle, and basic vehicle information such as an ambient illumination state and path details. The CAM may be 50 to 300 bytes long. The DENM may be a message generated upon occurrence of an unexpected incident such as breakdown or an accident of a vehicle. The DENM may be shorter than 3000 bytes, and received by all vehicles within its transmission range. The DENM may have priority over the CAM. When it is said that a message has priority, this means to a UE that if messages are to be transmitted at the same time, a message having a higher priority is transmitted above all, or a message with a higher priority among a plurality of messages is transmitted earlier in time. From the perspective of a plurality of UEs, a high-priority message is made less vulnerable to interference than a low-priority message, thereby having a reduced reception error probability. The CAM may have a larger message size with security overhead than without security overhead.

Meanwhile, for D2D communication between UEs, D2D frame numbers (DFNs) are configured on the basis of a common timing in order to configure a resource area and conduct communication between the UEs. A DFN of a PSBCH transmitted by a specific SS-transmitting UE may be used. If a UE is within a cellular network, an SFN of an eNB may be configured as a DFN. Or a UE having GNSS reception capability may configure a DFN on the basis of the GNSS timing.

In V2X communication, initial synchronization establishment is very significant in view of fast mobility of UEs. If vehicle UEs (V-UEs) have the GNSS reception capability, and configure V2X DFNs on the basis of the GNSS timing, communication is active between the V-UEs even when a signal from an eNB is not seen. However, the use of the GNSS-based (coordinated universal timing (UTC)) timing at the V-UEs may cause a problem in signal transmission and reception to and from an eNB, depending on whether the eNB uses the GNSS timing. For example, it may not be clear when a UE using the GNSS-based UTC timing is to apply control information transmitted by the eNB using a UTC timing without any relation to the GNSS on the basis of which timing. In this context, various embodiments of the present disclosure to overcome the ambiguity will be described below.

UE Operation when UE Configures DFN on Basis of GNSS Timing

Case in which eNB Has No Knowledge of GNSS Timing

If an eNB transmits a mode-1 grant, an SPS activation/release, or any other sidelink control signal to a UE, upon receipt of the signal, the UE performs an actual operation in a subframe corresponding to the time of receiving the signal from the eNB (an subframe n)+4 or more subframes. If the eNB has no knowledge of the GNSS timing, and the UE performs sidelink transmission and reception on the basis of GNSS timing-based DFNs, a time of applying an eNB indication to the UE may become an issue. In this case, the eNB may transmit UTC timing-related information (a UTC timing or radio frame/subframe boundary information based on the UTC timing. Herein, the UTC timing of the eNB is not GNSS-based timing information) based on which a signal is transmitted to the UE and/or a specific indication is applied to the UE, to the UE by physical-layer/higher-layer signaling. That is, upon receipt of control information from the eNB (S1001 in FIG. 10), the UE receives UTC timing-related information (one of the UTC timing of the eNB or radio frame/subframe boundary information based on the UTC timing of the eNB), for applying the control information (S1002 in FIG. 10).

Figure 10:
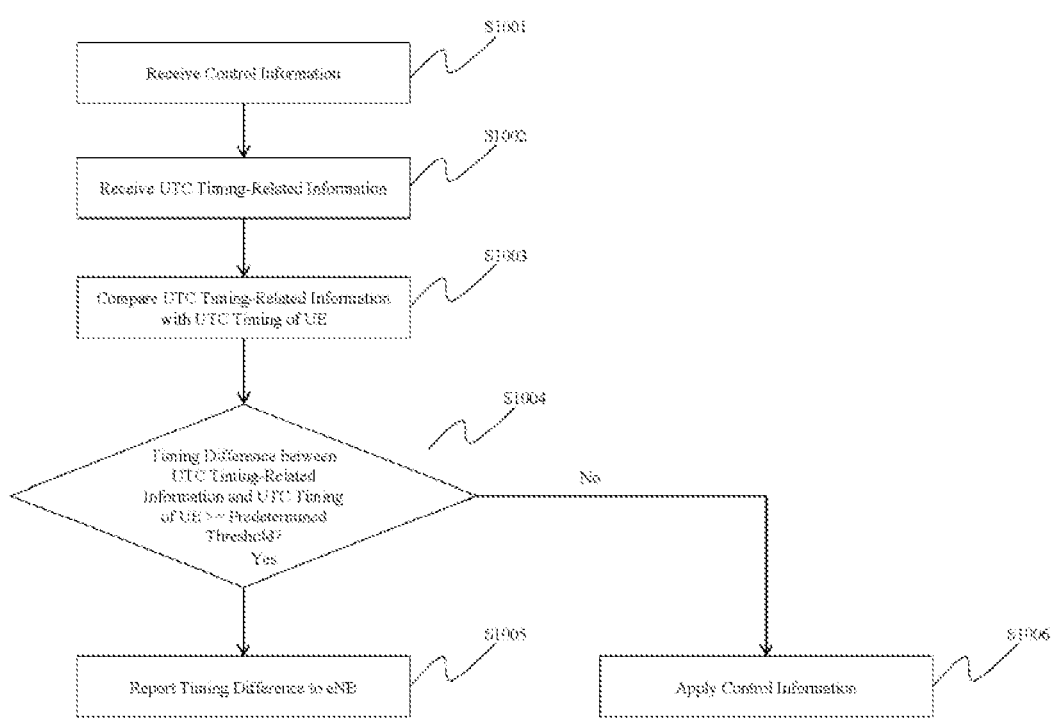
FIG. 10 is a flowchart illustrating an embodiment of the present disclosure.

The UE may compare the UTC timing-related information with a UTC timing of the UE (S1003 in FIG. 10). If the difference between the timings is equal to or larger than a predetermined threshold (e.g., a CP length) as a result of the comparison, the UE may report the timing difference to the eNB by a physical-layer or higher-layer signal (S1005 in FIG. 10). If the timing difference is less than the threshold, the UE may apply the control information according to the UTC timing-related information (S1006 in FIG. 10).

The UTC timing of the UE may be based on the GNSS, whereas the UTC timing-related information of the eNB may not be based on the GNSS. Or although the eNB has acquired the UTC timing, the eNB may have not set SFNs to be identical to DFNs for some reason, or there may be an error in the acquired UTC timing. For example, the eNB may set the timing of applying the indication signaled to the UE on the basis of the UTC, and signal the timing to the UE. Herein, the UE may apply the indication of the eNB on the basis of the UTC timing of the UE, or execute the eNB indication according to the UTC timing of the eNB (indicated by SIB 16).

The UE may perform an operation on the basis of the UTC timing of the eNB. That is, the UE may apply the control information according to the UTC timing-related information irrespective of or after the reporting. In this case, the UE needs to transmit the timing difference to a sidelink signal receiving UE. The timing difference may be transmitted to the sidelink signal receiving UE by at least one of an SLSS, a PSBCH, a PSSCH, or a PSCCH. Since the receiving UE may not know a transmission timing of a signal indicating the timing difference, the signal indicating the timing difference may be transmitted on the basis of the UTC timing of the UE. After the timing difference is signaled, a signal may be transmitted on the basis of the UTC timing of the eNB. In this method, the eNB may determine an accurate timing at which the UE operates.

In a specific example of the above description, for semi-persistent scheduling (SPS), activation DCI may include information indicating when this activation is to be applied from the perspective of/on the basis of UTC (or DFN). Further, if control information corresponds to SPS, UTC timing-related information may be included only in an SPS activation, not in an SPS release. This is because the timing applying operation is applied strictly to SPS activation, but there may be no need for such strict application to SPS release. In SPS release, a release operation may be applied shortly after a predetermined window from the transmission time of the DCI. If the SPS activation includes timing information, its overhead may be too large. Therefore, a method of reducing the overhead may be considered. For example, if an eNB-determined UTC error is within x ms, the UE may partition a total UTC domain into units each larger than 2× ms, and determine a partition corresponding to the time of applying to be the transmission time of the DCI, while using information set in the DCI for a position within the partition. In another example, when UTC is determined for applying DCI, a part of MSBs of a bit string indicating the UTC may be determined by the time of DCI transmission from the eNB (the time of DCI reception on the part of the UE), and the remainder may be determined by a field set in the DCI.

Meanwhile, if an SPS-based uplink transmission overlaps with a sidelink transmission, a UE may drop one of the uplink transmission or the sidelink transmission according to predetermined priority levels. This transmission overlap may occur when an eNB with no GNSS connection assigns sidelink (SL) SPS to the UE, and the UE applies the SL SPS according to a GNSS-based UTC timing of the UE. Herein, a safety message may have a preset priority level higher than uplink transmission. Even SL transmission may have a lower priority than UL transmission, if the SL transmission is not for a safety message. Further, the UE may report the index of a subframe in which the overlap occurs to the eNB. The eNB may change the SL SPS of the corresponding area or UL scheduling, using the report.

Meanwhile, it may be regulated that the timing of an eNB is always used in mode 1 and V2X mode 3. In mode 1 and mode 3, the UE always uses the UTC timing-related information irrespective of the report. That is, if the eNB indicates sidelink transmission and reception resources, the timing of the eNB is always used. In this case, there is a need for including timing information in a PSBCH, an SA, or the like for other GNSS UEs. For example, if a UE is configured to use the GNSS with a higher priority, a higher priority is given to the eNB exceptionally in mode 1, thereby configuring a subframe timing. In mode 1, DFNs may also be based on SFNs of the eNB. That is, even though the GNSS has a higher priority, a sidelink subframe timing and number are always determined on the basis of the timing of the eNB in mode 1. If a mode-2 UE performs sidelink transmission and reception by using the GNSS as a timing reference, disparity may occur between the timing of mode 1 and the timing of mode 2, resulting in inactive communication or subframe overlap. In this context, resources of mode 1 and resources of mode 2 may be multiplexed in time division multiplexing (TDM), or a resource pool of mode 1 and a resource pool of mode 2 may be multiplexed in frequency division multiplexing (FDM). If the resource pools are multiplexed in FDM as such, a receiving UE may configure a fast Fourier transform (FFT) window according to each timing (eNB/GNSS) in receiving in mode 1 and mode 2. It may further be generalized that synchronization source priority levels may be configured (between the eNB and the GNSS) separately for mode 1 and mode 2 by the network. By these methods, the ambiguity between an eNB-indicated subframe boundary and a sidelink subframe boundary in mode 1 may be eliminated.

Meanwhile, if a resource pool is shared between mode 1 (mode 3 in V2X) and mode 2 (mode 4 in V2X) (i.e., there is a common area between the resources of mode 1 or mode 3 and the resources of mode 2 or mode 4), a field distinguishing mode 1 (mode 3) from mode 2 (mode 4) may be transmitted in an SA, so that the receiving UE may decode a signal transmitted in mode 1 (or mode 3), with priority, or perform resource selection/reselection, considering that a signal of mode 1 (or mode 3) has a higher priority. Or mode 1 and mode 2 (mode 3 and mode 4) may be distinguished by different priority levels and represented by a Priority field. This Priority field may be included and transmitted in an SA. Or a method of configuring different SAs, and/or cyclic shifts (CSs) of DMRSs transmitted in data, and/or orthogonal cover codes (OCCs), and/or base sequence IDs for mode 1 (mode 3 in V2X) and mode 2 (mode 4 in V2X) is proposed. Herein, decoding with priority amounts to, if the network configures 20 data transmission channels (separated in frequency) for a UE, and the UE is capable of decoding only 10 data in one subframe, decoding data of mode 1/3 from among the received 20 data, first of all. Considering that a mode 1/3 signal has a higher priority specifically means that a mode-2/4 transmitting UE first excludes resources transmitted by a mode-1/3 UE, and considers the remaining resources as transmission resources, or if the mode-2/4 UE detects a mode-1/3 signal in resources used by the mode-2/4 UE, the mode-2/4 UE performs resource reselection. In the current 3GPP sidelink, the same PSCCH (i.e., SA) DMRS generation scheme is considered for mode 1/3 and mode 2/4. If PSCCH DMRSs are configured differently in mode 1/3 and mode 2/4, it may be determined whether a corresponding SA is for mode 1 or mode 2 in a PSCCH decoding phase without any indication in an additional field. Upon recognizing by SA decoding, energy sensing, or the like that another UE is using resources of mode 1 (mode 3), a mode-1/3 UE may report the use of the mode-1 (mode-3) resources at another UE to the eNB, and request resource reselection to the eNB. In this manner, even though a mode-1/3 UE and a mode-2/4 UE operate in one pool, continuous resource collision between the UEs may be prevented.

According to the above description, a UE may receive, from one or more of an eNB or a sidelink UE, control information including information that identifies a mode-1/3 signal or a mode-2/4 signal or priority levels assigned to mode 1/3 and mode 2/4, respectively, determine whether any UE other than the UE is using mode-1/3 resources on the basis of the information identifying a mode-1/3 signal or a mode-2/4 signal, and if any UE other than the UE is using the mode-1/3 resources, and the UE is a mode-1/3 UE, request resource reselection to the eNB. The UE may transmit, to a sidelink UE, the control information including the information that identifies a mode-1/3 signal or a mode-2/4 signal or the priority levels assigned to mode 1/3 and mode 2/4, respectively.

If any UE other than the UE is using the mode-1/3 resources, and the UE is a mode-2/4 UE, the UE may perform resource reselection. The mode-1/3 resources may have a common area with mode-2/4 resources. The UE may decode data corresponding to mode 1/3 with priority from among a plurality of received data on the basis of the information identifying a mode-1/3 signal.

The foregoing operations may be performed before UTC timing-related information for applying the control information is received from the eNB. Or the foregoing operations may be performed independently of the above description.

Even though the UE conducts sidelink communication, using the timing of the eNB, a time of applying a (DL) signal of the eNB may be set clearly in the above method.

Meanwhile, the timing difference reported by the UE may be used for the eNB to configure a resource pool. Specifically, the eNB may acquire DFN information from the report of the UE, and configure a certain subframe adjacent to the resource pool as a guard. A resource pool including the guard may be configured even before the report of the timing difference is received from the UE. The eNB may not perform cellular scheduling in the resource pool including the guard as well as the resource pool area. In this case, since a resource pool may be configured on the basis of the same timing between cells, even though the UE moves out of a cell, the UE may continuously use the resource pool. Configuration of a resource pool will be described below in detail in an independent example.

Besides, if an eNB having no knowledge of the GNSS timing transmits control information in an subframe n, the UE may detect/find a (GNSS timing-based) sidelink subframe closest to the subframe n (a close sidelink subframe after the subframe n), and then perform an operation indicated by the eNB in an subframe n+k (k is a predetermined value, for example, k=4) from the sidelink subframe. Or the UE may detect/find a (GNSS timing-based) sidelink subframe closest to the subframe n+k (a close sidelink subframe after the subframe n+k) (k is a predetermined value, for example, k=4), and then perform an operation indicated by the eNB in the corresponding subframe.

Case in which eNB Has Knowledge of GNSS Timing

If the eNB has knowledge of the GNSS timing for such a reason as the eNB having the GNSS reception capability, reception of timing information about the UE at the eNB (e.g., the UE signals timing information such as the difference between a DFN timing and an SFN timing to the eNB by a physical-layer/higher-layer signal), or reception of GNSS timing information from a server at the eNB, the eNB may configure a resource pool on the basis of a DFN of the UE. Further, the eNB may signal a sidelink grant, an SPS activation/release, or the like on the basis of a DFN, and the UE may perform an operation on the basis of a GNSS timing-based DFN after receiving the specific signaling.

If the eNB having no knowledge of the GNSS timing gets aware of the GNSS timing in a specific situation, eNB signaling may be impossible during a time period in which an SFN is changed. In this case, the eNB may indicate that the current SFN will change to a different timing (a GNSS-based timing) a predetermined time later to the UE by physical-layer or higher-layer signaling. Further, the eNB may transmit information indicating whether the eNB is using the GNSS timing to the UE by physical-layer or higher-layer signaling. The UE may differentiate an operation using SPS resources, or determine whether resource pool information is still valid when moving to a neighbor cell, on the basis of the received information. Further, the UE may determine when to perform an operation indicated by the eNB.

Resource Pool Configuration Timing

SFN Timing of eNB as Reference

Resource pool information transmitted by the eNB may be configured on the basis of an eNB timing (on the basis of SFN 0 of the eNB), and without accurate knowledge of the GNSS timing, the eNB may signal a rough timing offset value. Further, a window value by which the UE searches for a DFN boundary from the offset may be signaled, so that an operation of searching for a DNSS timing-based DFN boundary may be performed within a corresponding window. If the eNB can get knowledge of the GNSS timing, a small window value may be set.

DFN Timing (or UTC Timing) as Reference

A resource pool may be configured on the basis of the DFN timing (or UTC timing). Resource pool information transmitted by the eNB may be applied to a GNSS timing-based DFN (a DFN generated on the basis of the UTC timing). Since the eNB may not be aware of an accurate DFN boundary (or there may be a difference between a UTC timing assumed by the eNB and a UTC timing that the UE has acquired from the GNSS), the eNB may acquire rough DFN information by receiving a report of timing information from the UE or in any other manner, and then empty a certain subframe adjacent to a resource pool as a guard or restrict scheduling for the UE.

Or even though the eNB does not receive the report of the timing difference from the UE (or even before the eNB receives the report of the timing difference from the UE), the eNB may configure a predetermined area as a guard area. The eNB may configure an area including a guard window as well as a resource pool area as a gap, and may not perform cellular scheduling or signaling in the gap. In the case of an unclear timing in configuring SPS resources as well as a resource pool (when the UE performs sidelink transmission and reception without using the timing of the eNB), this method may be used to determine the accurate position of SPS resources.

Other SPS Operations

SFN Timing of eNB as Reference

When with a plurality of SPS resources allocated to the UE, the UE moves across the boundary of a cell or goes near to another cell, the UE may change the SPS resources. Although the eNB may transmit an activation message to the UE, the UE may transmit an activation request message to the eNB, or autonomously activate and use SPS resources of the corresponding cell. The UE may transmit information about the current activated SPS resources to the eNB by physical-layer or higher-layer signaling.

DFN Timing (or UTC Timing) as Reference

Basically, when with SPS resources configured for the UE by the eNB in an SPS operation, the UE moves to another cell, the UE uses SPS resources of the corresponding cell. In V2X, however, if a V-UE moves fast, handover frequently occurs. Thus, long latency is involved for the UE to get SPS resources configured again and perform an activation/release operation. Accordingly, if the UE performs sidelink transmission and reception on the basis of the GNSS timing, the UE may operate in SPS resources without an activation command from an eNB of a target cell. For this purpose, the eNB may configure SPS resources common to a plurality of cells for the UE, and even though the UE moves to another cell, the UE may continuously use the SPS resources.

Now, a detailed description will be given of per-Mode operations. A mode-1 UE may receive system information from a target cell, and continuously use SPS resources until before a resource pool is changed or another activation message is received. That is, compared to the conventional technology in which when the UE moves to another cell, the UE cannot perform transmission until before existing resources are released and a new activation message is received, the UE may perform transmission, still using existing resources even before reception of an additional activation message in this embodiment.

If a mode-2 or mode-4 UE moves to another cell, the mode-2 or mode-4 UE may continue sidelink transmission, using a resource pool of an old cell until receiving information indicating that the resource pool has been changed (in an SIB) from the target cell. As in mode 1, compared to the conventional sidelink operation in which when the UE moves to another cell, the UE discontinues transmission in an old resource pool, and resumes the sidelink transmission after receiving resource pool information of a target cell, if the UE performs sidelink transmission at the GNSS timing, there is a high possibility of aligning resource pools between cells, and thus the UE may continue the sidelink transmission and reception even before receiving a new SIB. In this case, latency can be reduced.

In mode 2 or mode 4, the UE may determine and use a resource pool according to geo-location information about the UE. Herein, the UE receives Tx resource pool information of a serving cell and a neighbor cell in SIBs. It is proposed that if the UE changes its location, the UE uses the Tx pool information of the neighbor cell even before receiving the SIB. As described before, although a resource pool is likely to be changed according to the location of the UE, the UE may continue sidelink transmission even before receiving an SIB from the target cell.

Meanwhile, it may occur that if the resource pool is changed due to a change in the location of the UE, the UE cannot use existing reserved resources.

If resources are reserved during a previous message generation period, the UE may perform transmission in the reserved resources. In this operation, while a resource pool selection operation is performed on the basis of the geo-location information about the UE, if the UE has reserved resources during the previous message generation period, the UE exceptionally perform transmission in the reserved resources.

If the resource pool is changed (due to a change in the geo-location information about the UE), the UE may not use the reserved resources in spite of the reservation. Herein, the UE may transmit information indicating that the UE will not use the reserved resources to another UE by an SA or through a data channel before or after the pool is changed.

Method of Indicating SPS Time Resources

SPS time resources may be indicated by a T-RPT as defined in LTE Release 12/13. In V2X, the T-RPT may be applied only once, without being repeated during a resource period. Further, in V2X, a resource period may not be defined, or even if a resource period is defined, the resource period may be used just to indicate a transmission subframe in a specific time area, not a scheduling period. For example, if mode-1 DCI is transmitted in an subframe n to a UE, the UE may apply a T-RPT a predetermined number of times (e.g., once. The network may indicate the number by physical-layer or higher-layer signaling) in a $(n+4)^{th}$ subframe or a closest mode-1 or mode-3 (sidelink) subframe with an index equal to or larger than (n+4). The position of SA resources may not be indicated separately, but as an offset from the position of data resources. The offset may be 0 in an extreme case. In this case, an SA and data may be transmitted in the same subframe.

An SPS time resource indication may be configured to indicate the starting point of transmission and a retransmission length. Information indicating an interleaved transmission such as a T-RPT and continuous or non-continuous transmission may be transmitted to the UE by physical-layer or higher-layer signaling.

Meanwhile, if subframes are indicated by a form such as a T-RPT, only a T-RPT which is orthogonal in time, has a predetermined K value, or is preset may be indicated in the form of SPS. A preset available T-RPT set may be indicated preliminarily by higher-layer signaling, and the UE may perform transmission by using an indicated T-RPT in the set.

Meanwhile, if the same T-RPT is used in each message transmission period, continuous transmission and reception to and from a specific UE becomes impossible. To avert the problem, T-RPTs used by UEs within the same cell may be changed at each message transmission. For example, if T-RPT 1 to T-RPT N are used in a specific cell, a UE uses a different numbered T-RPT in each message generation period. For example, UE1 may change T-RPTs in the order of T-RPT #0→T-RPT #1→T-RPT #3→T-RPT #4 . . . , and UE2 may change T-RPTs by the same number of indexes in the order of T-RPT #2→T-RPT #3→T-RPT #5→T-RPT #6 . . . . Herein, the changed patterns may be a function of a cell ID. In this manner, an eNB may perform scheduling orthogonally, and make T-RPTs changed simultaneously, with the orthogonality maintained, within a cell, whereas T-RPTs may be changed randomly between cells. Therefore, a half-duplex problem may be overcome without tight scheduling coordination between UEs in different cells.

While a T-RPT may be subject to index hopping on a cell basis, a cell-common time offset may be used in applying a T-RPT. A different offset pattern may be set in each cell. Application of a different offset is also intended to solve the half-duplex problem with a UE in another cell by allocating resources in the manner that avoids resource collision and thus solves the half-duplex problem within a cell, and then applying a common time offset to UEs within the same cell by an eNB.

The method of subjecting a time-domain offset to hopping in a different manner for each cell may also be applied to the method of setting a starting point and a repetition length as well as a T-RPT.

Meanwhile, the UE may not use all subframes indicated by the eNB in view of a small size of a packet to be transmitted. Then, the eNB may explicitly indicate a subframe to be used for actual transmission among subframes indicated for each UE by the eNB, or the UE may determine a subframe to be used and signal the determined subframe to the eNB, or a transmission subframe may be determined by a function of an ID (RNTI) of the UE or a function of a cell ID.

If UEs perform sidelink transmission and reception on the basis of the GNSS timing, timing information about the starting point of a subframe may be indicated to the UEs by physical-layer or higher-layer signaling.

If a UE performs SPS, information about an SPS period may also be included and transmitted in DCI. The SPS period may be represented as a resource period (if defined), and the number of resource periods for periodic transmission may be signaled.

Examples of the above-described proposed methods may be included as one of methods for implementing the present disclosure. Thus, it is obvious that the examples may be regarded as proposed methods. Further, while the proposed methods may be implemented independently, some proposed methods may be combined (or integrated). It may be regulated that information indicating whether the proposed methods are applied or not (or information about rules of the proposed methods) is transmitted to a UE in a predefined signal (e.g., a physical-layer signal or a higher-layer signal) by an eNB.

Apparatuses According to Embodiment of the Disclosure

Figure 11:
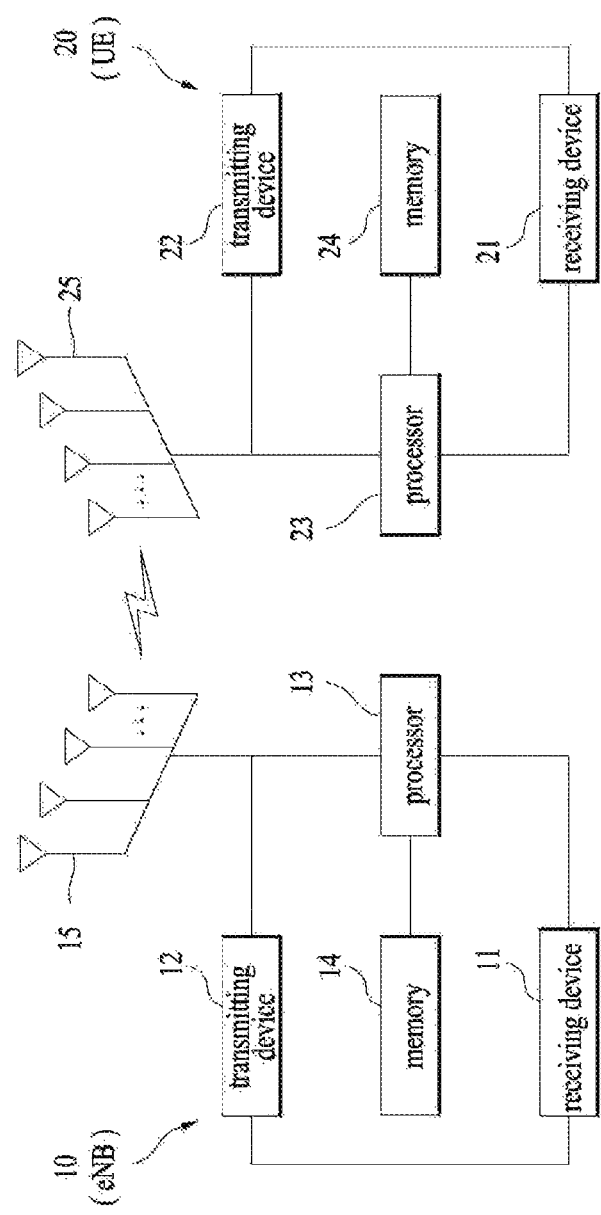
FIG. 11 is a block diagram of a transmission apparatus and a reception apparatus.

FIG. 11 illustrates configurations of a transmission point and a UE according to an embodiment of the present disclosure.

Referring to FIG. 11, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10.

According to an embodiment of the present disclosure, the processor 12 of the transmission point 10 may process requirements of each of the foregoing embodiments.

Besides, the processor 13 of the transmission point 10 may compute and process information received by the transmission point 10 and information to be transmitted to the outside. The memory 14 may store computed and processed information for a predetermined time, and may be replaced with a component such as a buffer (not shown).

With continued reference to FIG. 11, a UE 20 according to the present disclosure may include a receiver 21, a transmitter 22, a processor 23, a memory 24, and a plurality of antennas 25. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

According to an embodiment of the present disclosure, the processor 23 of the UE 20 may process requirements of each of the foregoing embodiments. Specifically, the processor may receive, from one or more of an eNB or a sidelink UE, control information including information identifying a mode-1/3 signal or a mode-2/4 signal, or priority levels assigned to mode-1/3 and mode-1/4, respectively through the receiver, determine whether any UE other than the UE is using mode-1/3 resources on the basis of the information identifying a mode-1/3 signal or a mode-2/4 signal, and if any UE other than the UE is using mode-1/3 resources, and the UE is a mode-1/3 UE, request resource reselection to the eNB.

Besides, the processor 23 of the UE 20 may compute and process information received by the UE 20 and information to be transmitted to the outside. The memory 24 may store computed and processed information for a predetermined time, and may be replaced with a component such as a buffer (not shown).

The aforementioned transmission point and UE may be implemented such that the above-described various embodiments of the present disclosure are independently applied or two or more thereof are simultaneously applied, and description of redundant parts is omitted for clarity.

Further, the description of the transmission point 10 in the description of FIG. 11 is applicable to a relay as a DL transmission entity and a UL reception entity, and the description of the UE 20 in the description of FIG. 11 is applicable to a relay as a UL transmission entity and a DL reception entity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting a sidelink signal by a first user equipment (UE) in a wireless communication system, the method comprising:

receiving, by the first UE from a base station (BS), control information related to sidelink at a subframe n; and transmitting, by the first UE to a second UE, the sidelink signal based on the control information at a subframe n+k, wherein the subframe n+k is a first sidelink subframe after subframe n+4, wherein the subframe n+k and the subframe n+4 are derived from a Coordinated Universal Time (UTC), wherein the UTC is obtained from a Global Navigation Satellite System (GNSS), wherein the GNSS is used as a synchronization reference source of the first UE, wherein, based on the first UE being out-of-coverage for a cell, the sidelink signal is transmitted based on preconfigured resources for the cell, wherein, based on the UTC for determining a boundary of subframes having an error within a certain range, the UTC is applied by the first UE itself, and wherein k is an integer not being a negative integer.

2. A first user equipment (UE) for transmitting a sidelink signal in a wireless communication system, the first UE comprising:

a transmitter and a receiver; and a processor, wherein the processor is configured to:

receive, from a base station (BS), control information related to sidelink at a subframe n; and transmit, to a second UE, the sidelink signal based on the control information at a subframe n+k, wherein the subframe n+k is a first sidelink subframe after subframe n+4, wherein the subframe n+k and the subframe n+4 are derived from a Coordinated Universal Time (UTC), wherein the UTC is obtained from a Global Navigation Satellite System (GNSS), wherein the GNSS is used as a synchronization reference source of the first UE, wherein, based on the first UE being out-of-coverage for a cell, the sidelink signal is transmitted based on preconfigured resources for the cell, wherein, based on the UTC for determining a boundary of subframes having an error within a certain range, the UTC is applied by the first UE itself, and wherein k is an integer not being a negative integer.

* * * * *